United States Patent
Johns et al.

(10) Patent No.: US 6,589,043 B1
(45) Date of Patent: Jul. 8, 2003

(54) PUNCH STRIPPER RING KNOCK-OUT FOR PRESSWARE DIE SETS

(75) Inventors: Albert D. Johns, Saylorsburg, PA (US); Mark B. Littlejohn, Appleton, WI (US); Thomas W. Zelinski, Menasha, WI (US)

(73) Assignee: Fort James Corporation, Deerfield, IL (US)

( * ) Notice: Subject to any disclaimer, the term of this patent is extended or adjusted under 35 U.S.C. 154(b) by 317 days.

(21) Appl. No.: 09/678,930

(22) Filed: Oct. 4, 2000

Related U.S. Application Data

(60) Provisional application No. 60/157,454, filed on Oct. 4, 1999.

(51) Int. Cl.[7] .............................................. B29C 43/36
(52) U.S. Cl. ..................... 425/403.1; 425/410; 425/422
(58) Field of Search .................................. 425/422, 410, 425/406, 394, 403.1

(56) References Cited

U.S. PATENT DOCUMENTS

| | | | |
|---|---|---|---|
| 4,435,143 A | 3/1984 | Dempsey | 425/150 |
| 4,609,140 A | 9/1986 | Van Handel et al. | 229/2.5 R |
| 4,721,500 A | 1/1988 | Van Handel et al. | 493/152 |
| 4,755,128 A | 7/1988 | Alexander et al. | 425/292 |
| 4,778,439 A | 10/1988 | Alexander | 493/169 |
| 4,832,676 A | 5/1989 | Johns et al. | 493/152 |
| 5,041,071 A | 8/1991 | Reasinger et al. | 493/167 |
| 5,249,946 A | 10/1993 | Marx | 425/142 |
| 6,139,307 A | * 10/2000 | Plourde et al. | 425/192 R |

* cited by examiner

Primary Examiner—Robert Davis
Assistant Examiner—Thu Khanh T. Nguyen
(74) Attorney, Agent, or Firm—Michael W. Ferrell

(57) ABSTRACT

In a pressware die set, a segmented punch for fabricating a pressed disposable food service article having a substantially planar bottom portion, a sidewall and a rim portion. In one embodiment, the punch is mounted to reciprocate cyclically between an open position and a forming position about an axis of reciprocation and includes outer punch surfaces for forming the sidewall and rim portions of the pressed disposable food service articles, as well as a substantially planar punch surface suitably mounted and dimensioned to engage the substantially planar bottom portion of the disposable food service article. The improved punch includes a knock-out stripper ring juxtaposed with the substantially planar punch surface, defining a knock-out surface and which is reciprocally mounted with respect to the central substantially planar punch surface such that the knock-out surface is contiguous with the substantially planar punch surface when the punch is in a forming position. The knock-out surface of the knock-out stripper member projects axially from the substantially planar punch surface when the punch reciprocates towards its open position. The knock-out surface area is generally from about 3 to about 50% of the area of the substantially planar surface of the punch.

12 Claims, 13 Drawing Sheets

PUNCH STRIPPER RING KNOCK-OUT FOR PRESSWARE DIE SETS

CROSS-REFERENCE TO RELATED APPLICATIONS

This application claims the benefit of the filing date of U.S. Provisional Patent Application Ser. No. 60/157,454, filed Oct. 4, 1999.

TECHNICAL FIELD

The present invention relates generally to die sets for making food serving disposable pressware such as plates, bowls, trays, or the like from container blanks and more particularly to a punch stripper ring knock-out for purposes of separating the finished product from a die set punch half.

BACKGROUND

Pressed containers, such as pressed paperboard containers including plates, trays, bowls and the like are well known in the art. Typically, such articles are manufactured on an inclined die set having upper and lower halves. Illustrative in this regard is U.S. Pat. No. 5,249,946 to Marx assigned to the assignee of the present invention. Referring to the '946 patent, a typical product is manufactured by way of feeding a continuous paperboard web into a cyclically operating blanking section. The forming section includes a plurality of reciprocating upper die halves opposing, in facing relationship, a plurality of lower die halves. The upper die halves are mounted for reciprocating movement in a direction that is oblique or inclined with respect to the vertical plane. The blanks, after cutting, are gravity fed to the inclined lower die halves in the forming section.

Forming operations can be somewhat critical in order to produce quality product at the desired rates. In this respect U.S. Pat. No. 4,721,500 to Van Handle et al. is informative. Note also U.S. Pat. No. 4,609,140 to Van Handle et al. The '140 patent provides a general description of one known forming method as will be appreciated from FIG. 3 thereof. FIG. 3 shows a cross section of the upper die half and lower die half which are utilized to press a flat, circular paperboard blank into the shape of the plate. The construction of the die halves and the equipment on which they are mounted is substantially conventional; for example, as utilized on presses manufactured by the Peerless Manufacturing Company. To facilitate the holding and shaping of the blank, the die halves are segmented in the manner shown. The lower die has a circular base portion and a central circular platform which is mounted to be moveable with respect to the base. The platform is cam operated in a conventional manner and urged toward a normal position such that it's flat top forming surface is initially above the forming surface of the base. The platform is mounted for sliding movement to the base, with the entire base itself being mounted in a conventional manner on springs. Because the blank is very tightly pressed at the peripheral rim area, moisture in the paperboard which is driven therefrom during pressing and the heated dies cannot readily escape. To allow the release of this moisture, at least one circular groove is provided in the surface of the base which vents to the atmosphere through a passageway. Similarly, the top die half is segmented into an outer ring portion, a base portion and a central platform having a flat forming surface. The base portion has curved, symmetrical forming surfaces and the outer ring has curved forming surfaces. The central platform in the outer ring are slidingly mounted to the base and biased by springs to their normal position shown in FIG. 3 in a commercially conventional manner. The top die half is mounted to reciprocate toward and away from the lower die half. In the pressing operation, the blank is first laid upon the flat forming surface, generally underling the bottom wall portion of the plate to be formed, and the forming surface makes first contact with the top of the blank to hold the blank in place as the forming operation begins. Further downward movement of the top die half brings the spring-biased forming surfaces of the outer ring into contact with the edges of the blank to begin to shape the edges of the blank over the underlying surfaces in the areas which will define the overturned rim of the finished plate. However, because the ring is spring-biased the paperboard material in the rim area is not substantially compressed or distorted by the initial shaping since the force applied by the forming surfaces is generally light and limited to the spring force applied to the ring. Eventually, the top die half moves sufficiently far down so that the platform segments and the ring are fully compressed such that the adjacent portions of the forming surfaces are coplanar. In a conventional manner the die halves are heated with electrical resistance heaters and the temperature of the die halves is controlled to a selected level by monitoring the temperature of the dies with thermistors mounted in the dies as close as possible to the forming surfaces.

For paperboard plates stock of conventional thicknesses ie. in the range of from about 0.010 to about 0.040 inches, it is preferred that the spacing between the upper die surface and the lower die surface decline continuously from the nominal paperboard thickness at the center to a lower value at the rim.

The springs upon which the lower die half is mounted are typically constructed such that the full stroke of the upper die results in a force applied between the dies of from about 6000 to 8000 pounds.

The paperboard which is formed into the blanks is conventionally produced by a wet laid paper making process and is typically available in the form of a continuous web on a roll. The paperboard stock is preferred to have a basis weight in the range of from about 100 pounds to about 400 pounds per 3000 square foot ream and a thickness or caliper in the range of from about 0.010 to about 0.040 inches as noted above. Lower basis weights in caliper paperboard is preferred for ease of forming and realizing savings in feedstock costs. Paperboard stock utilized for forming paper plates is typically formed from bleached pulp furnish, and is usually double clay coated on one side. Such paperboard stock commonly has a moisture (water content) varying from about 4.0 to about 8.0 percent by weight.

The effect of the compressive forces at the rim is greatest when the proper moisture conditions are maintained within the paperboard: at least 8% and less than 12% water by weight, and preferably 9.5 to 10.5%. Paperboard in this range has sufficient moisture to deform under pressure, but not such excessive moisture that water vapor interferes with the forming operation or that the paperboard is too weak to withstand the high compressive forces applied. To achieve the desired moisture levels within the paperboard stock as it comes off the roll, the paperboard is treated by spraying or rolling on a moistening solution, primarily water, although other components such as lubricants may be added. The moisture content may be monitored with a hand held capacitive type moisture meter to verify that the desired moisture conditions are being maintained. It is preferred that the plate stock not be formed for at least six hours after moistening to allow the moisture within the paperboard to reach equilibrium.

Because of the intended end use of the paper plates, the paperboard stock is typically coated on one side with a liquid proof layer or layers. In addition, for esthetic reasons, the paper plate stock is often initially printed before being coated. As an example of typical coating material, a first layer of polyvinyl acetate emulsion may be applied over the printed paperboard with a second layer of nitrocellulose lacquer applied over the first layer. The plate stock is moistened on the uncoated side after all of the printing and coating steps have been completed. In a typical forming operation, the web of paperboard stock is fed continuously from a roll through a cutting die to form the circular blanks which are then fed into position between the upper and lower die halves. The dies halves are heated as described above, to aid in the forming process. It has been found that best results are obtained if the upper die half and lower die half—particularly the surfaces thereof—are maintained at a temperature in the range of from about 250° F. to about 320° F., and most preferably at about 300° F.±10° F. These die temperatures have been found to facilitate the plastic deformation of paperboard in the rim areas if the paperboard has the preferred moisture levels. At these preferred die temperatures, the amount of heat applied to the blank is apparently sufficient to liberate the moisture within the blank under the rim and thereby facilitate the deformation of the fibers without overheating the blank and causing blisters from liberation of steam or scorching the blank material. It is apparent that the amount of heat applied to the paperboard will vary with the amount of time that the dies dwell in a position pressing the paperboard together. The preferred die temperatures are based on the usual dwell times encountered for normal production speeds of 40 to 60 pressings a minute, and commensurately higher or lower temperatures in the dies would generally be required for higher or lower production speeds, respectively.

Particular forming dies and processes for making pressed paperboard products are likewise well known. Most typically, dies sets for forming paperboard containers include a male or punch die half and a female die half. Typically, the punch half is reciprocally mounted with respect to its opposing die half and both die halves are segmented. One or more portions of the die halves may be spring-biased if so desired, and the particular geometry of the die will depend upon the product desired. In this regard, there is shown in U.S. Pat. No. 4,832,676 to Johns et al. an apparatus for forming a compartmented paperboard plate. The dies illustrated in the '676 patent includes spring-biased segments as well as pressure rings on the punch half. The particular apparatus further includes articulated, full area knock-outs.

As will be appreciated by one of skill in the art, the knock-outs are important for separating the finished product from the die halves, particularly during high speed operation. The mechanical features can be further augmented pneumatically as is disclosed in U.S. Pat. No. 4,755,128 to Alexander et al. Other patents of interest include:

U.S. Pat. No. 4,435,143 to Dempsey;
U.S. Pat. No. 5,041,071 to Reasinger et al. and
U.S. Pat. No. 4,778,439 to Alexander.

As will be appreciated from the foregoing patents, mechanical full area punch knock-outs, located in the bottom area of the punch half, commonly are used to aid in the removal of the formed pressware products from the punch by actuating a short distance from the punch contour. The full area punch knock-outs typically separate the product from the punch contour successfully but can create a vacuum between themselves and the formed product resulting in slow and inconsistent release. In the worst cases, the formed product is retained in the die set and it is formed into the following product (double pressed). The double pressed product typically will release from the die set since it has more weight and can more easily break the vacuum. The double press products are scrapped by manufacturing or inadvertently packaged and sold to the consumer. Inconsistent product release from the punch can result in lower forming press productivity, increased product manufacturing cost and reduced useful package count to the customer.

Stated another way, the formed product can remain on or experience slow release from the one piece, full area punch knock-outs due to a vacuum created between its smooth surface contacting the product's smooth coated surface. The suction force created by the vacuum and knock-out surface area (force=pressure (vacuum)×area) may exceed the weight of a paperboard product. The product thus cannot release until air enters between the product and the knock-out or an air eject blow-off system slides the product sideways along the knock-out surface. Either way can result in slow and inconsistent product release.

Mechanical articulated punch knock-outs provide utility by more positively pushing the blank into the die set bottom to provide for full height product formation. This is especially useful in deeper products, such as bowls where heavy paperboard gathering (pleating) can prevent full height product formation. Articulated knock-outs can provide an even better seal/vacuum between the product and the punch knock-out, since they can wrap around into sidewall areas resulting in inconsistent product release and requiring other mechanical means (ie. split punch flange forming) and/or air assist to remove the products.

Removing the product with air can also have unexpected and inconsistent results. Air flowing across light weight pressware products can result in a creation of a "Bernoulli Effect" low pressure lift analogous to that experienced by an airplane wing. The air flowing through the small area between the product and punch can be at high velocity and generate low pressure based on Bernoulli's Principle of conservation of energy. This low pressure can create an upward force that can hold the product against the punch contour and knock-out. Air timing and pressure is critical to remove the products. More air pressure and flow may not provide better release since higher air flow velocities and lift forces can be generated. Just the right amount of air at the correct timing is required to remove the product from the punch, thus resulting in inconsistent results.

The formed pressware products tend to remain on the punch of the die set due to vacuum created between the punch contour, punch knock-out and coated paperboard products particularly. Sudden movement of the punch upwardly after product pressing can also result in the product remaining on the punch due to the vacuum. Improperly cured or tacky surface paperboard coatings can also result in the product sticking to/remaining on the punch half. The various mechanical knock-outs may not be able to remove products with improperly cured/tacky coatings. Corrective action in the coating operation or alternative materials are typically required to improve product removal from the punch half when such coatings are encountered.

SUMMARY OF INVENTION

A mechanical punch stripper ring knock-out was conceived and developed which operates similarly to the full area punch knock-out but has much less surface area. The stripper ring knock-out still provides clamp and pleating control to the container blank during the initial stages of forming, but provides more positive, consistent product release after forming. Less surface area results in less vacuum force between the stripper ring knock-out and pressed product. The product releases from the punch half more quickly and consistently and is more easily assist air ejected from the forming die set without experiencing the Bernoulli Effect lift. The formed product may even remain in the lower die half when the stripper ring knock-out is used resulting in yet easier air assist product removal.

The stripper ring knock-out in accordance with the invention may have a stationary center piece that limits the stroke distance during actuation. A separate ring portion actuates and separates the formed product from the punch contour. The weight of the formed product more easily overcomes the lesser amount of vacuum generated forces resulting from the lesser stripper ring surface area. The stripper ring knock-out may be actuated by gravity (weight of ring or ring plus shaft), springs, pneumatic or any other suitable means. The stripper ring moving component should have several vent holes through it to prevent creation of a vacuum or billow type effect inside the ring when it actuates. Vent holes may also pass from behind the moving stripper ring component to the inside of the punch cavity to prevent air back pressure on its upward stroke and allow air to more quickly flow in during its eject stroke as can be seen from the appended Figures.

A stripper ring knock-out may be designed for circular, oval, or square style plates, bowls, and trays with the same overall assembly, small contact area concept such as to provide quick, consistent pressware product release. It is possible, that a stripper ring assembly may be designed that provides the same benefits as the articulated full area punch knock-out, but with a lesser perimeter area only. It is also possible that a spoked design may be produced with less area which would also provide a benefit. The invention described herein may be used for matched metal forming of paperboard, paper plastic composites and so forth for disposable food service containers.

In a pressware die set including a punch, or male half and a female, or die half, both halves are typically mounted in an oblique, or angled manner with respect to a vertical plane wherein the punch is most typically upwardly located with respect to the die and reciprocates toward the die. It is possible, however, to locate the die upwardly and have it reciprocate toward the punch or male half depending upon the particular apparatus employed.

There is provided in accordance with the present invention an improved reciprocating pressware die set including a male punch and a female die wherein the punch is a segmented punch for fabricating a pressed disposable food service article having a substantially planar bottom portion, a sidewall portion and a rim portion. The die set is mounted to reciprocate cyclically between a closed position and a forming or open position about an axis of reciprocation. The punch includes an outer punch surface for forming sidewall and rim portions of the pressed disposable food service articles and a central punch member suitably mounted inwardly with respect to the outer punch surface wherein the central punch member and optionally a portion of the outer punch surface defines a substantially planar punch surface configured to engage the planar bottom portion of the article during a forming cycle. The apparatus further includes a knock-out stripper member juxtaposed with the substantially planar surface of the punch. The knock-out surface of the knock-out stripper member is reciprocally mounted with respect to the substantially planar punch surface, such that the knock-out surface is contiguous with the substantially planar punch surface of the punch and forms a part thereof when the punch is in the forming (closed) position, and the knock-out surface of the knock-out stripper member projects axially from the substantially planar punch surface towards the female die when the die set reciprocates toward the open position. The inventive apparatus is further characterized in that the area of the knock-out surface is from about 3 to about 50% of the surface area of the substantially planar punch surface.

The area of the inventive knock-out surface is more typically from about 6 to about 30% of the surface area of the substantially planar punch surface and preferably from about 8 to about 20%. The knock-out surface of the knock-out stripper member may reciprocate over a distance of from about 1 inch to about 1/16 inch from the substantially planar surface of the punch, while from about 1/2 inch to about 1/8 inch from the substantially planar surface of the punch is perhaps more typical. In a preferred embodiment, the knock-out stripper member comprises an annular ring concentrically disposed at about the periphery of the central punch member, and may be biased to project downwardly toward a lower die in the open position. The annular ring may have a width (i.e., the distance per side between its inside diameter and outside diameter) of anywhere from about 0.062 inches to about 1 inch with from about 0.12 inches to about 0.5 inches being more typical. In most preferred embodiments, an annular ring may have a width of from about 0.18 to about 0.31 inches. Biasing means include a spring or a weight as further described herein. A gravity biased ring is preferred wherein the ring itself is of sufficient weight or the ring is coupled to a central shaft to provide additional weight.

In another aspect of the invention there is provided a method of making a pressed disposable food service article having a substantially planar bottom portion, a sidewall portion and a rim portion comprising disposing a container blank in a reciprocating pressware die set including a male punch and a female die, the punch being a segmented punch comprising;

(i) an outer punch member for forming the sidewall and rim portions of the pressed disposable food service articles and optionally configured to form part of the bottom portion of the article;

(ii) a central punch member inwardly mounted with respect to the outer punch member wherein said central punch member and optionally said outer punch member define a substantially planar punch surface configured to engage said substantially planar bottom portion of said article during a forming cycle; and (iii) a knock-out stripper member juxtaposed with the substantially planar surface defining a knock-out surface and being reciprocally mounted with respect to the substantially planar surface of the punch such that the knock-out surface is contiguous with said substantially planar punch surface and forms a part thereof when the punch is in the forming (closed) position and the knock-out surface of the knock-out stripper member projects axially from the substantially planar punch surface towards the female die when the die set reciprocates towards the open position. The area of the knock-out surface is from about 3 to about 50% of the surface area of the substantially planar surface of the punch. The second step of the process is pressing the container blank in the pressware die set. Typically, the process is practiced with paperboard container blanks having a thickness or caliper of from about 0.008 to about 0.050 inches. Thicknesses of from about 0.012 to about 0.025 inches are usually preferred.

BRIEF DESCRIPTION OF DRAWINGS

The invention is described in detail below with reference to several embodiments illustrating the apparatus of the present invention. In the drawings, similar numerals designate like parts. In the drawings.

DETAILED DESCRIPTION

The invention is described in detail hereinafter with reference to the drawings and specific embodiments thereof. Such description is for purposes of illustration and exemplification, only, and is not limitative of the invention. The spirit and scope of the present invention is set forth in the appended claims. Generally speaking, the present invention is directed to an improved knock-out for the punch half of a pressware die set used to make pressed disposable food serving articles. Typically, such articles are made from paperboard blanks as described in the following United States Patents, the disclosures of which are hereby incorporated by reference into this application: U.S. Pat. Nos. 5,249,946; 4,832,676; 4,721,500; and 4,609,140. Typically, articles formed in accordance with the invention include a substantially planar bottom portion, a sidewall portion, a rim portion and are formed from a scored or unscored blank of paperboard as can be appreciated from FIG. 1.

Figure 1:
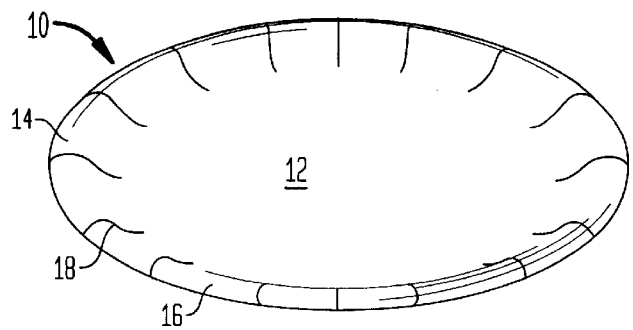
FIG. 1 is a perspective view of a pleated paper plate which may be formed utilizing the apparatus and method of the present invention.

FIG. 1 is a view in perspective of a paper plate 10 having a substantially planar bottom portion 12, as well as a sidewall portion 14, and a rim portion 16. The sidewall and rim 16 typically includes pleats 18 which may be facilitated by scores in a container blank. As will be appreciated, plate 10 is typically formed from a flat, circular container blank provided with a plurality of radial scores on a pressware die set.

Figure 2:
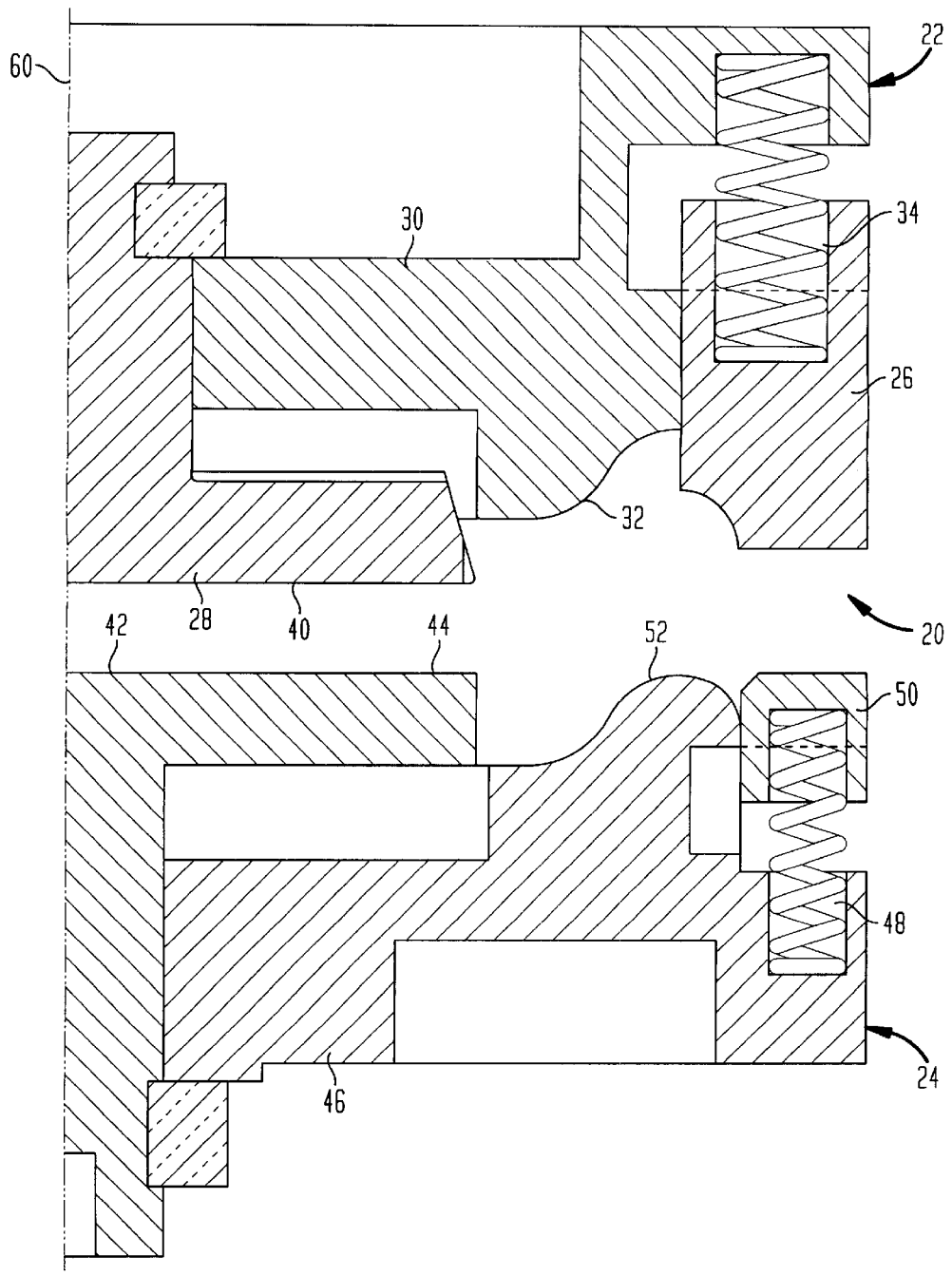
FIG. 2 is a schematic diagram in partial elevation and section of a known pressware die set including upper and lower dies in an open position.

There is shown in FIG. 2, in elevation and partial cross section, a view of a pressware die set (from the center line to the periphery) in an "open" position. Such apparatus and its operation is described in connection with U.S. Pat. No. 4,609,140 noted above. As shown in FIGS. 2–4(b), there is provided a die set 20 having a segmented upper half or punch 22 mounted in opposing relationship to a lower die half or die 24.

Punch 22 includes a pressure ring 26, a knock-out 28, a base plate 30 provided with a forming surface 32 and, if so desired, a plurality of springs, indicated at 34. Knock-out 28 is provided with a substantially planar surface 40 configured to engage a container blank in its central portion along with a portion of forming surface 32 and to form the planar bottom portion 12 of a food service container; that is, to engage the bottom 12 of a container.

Die 24 also includes a knock-out 42, having a planar surface 44 for engaging the central portion of a pressware container, a base plate 46, a plurality of springs 48, as well as a draw ring 50 mounted thereon. Plate 46 also includes a forming surface 52.

Figure 3:
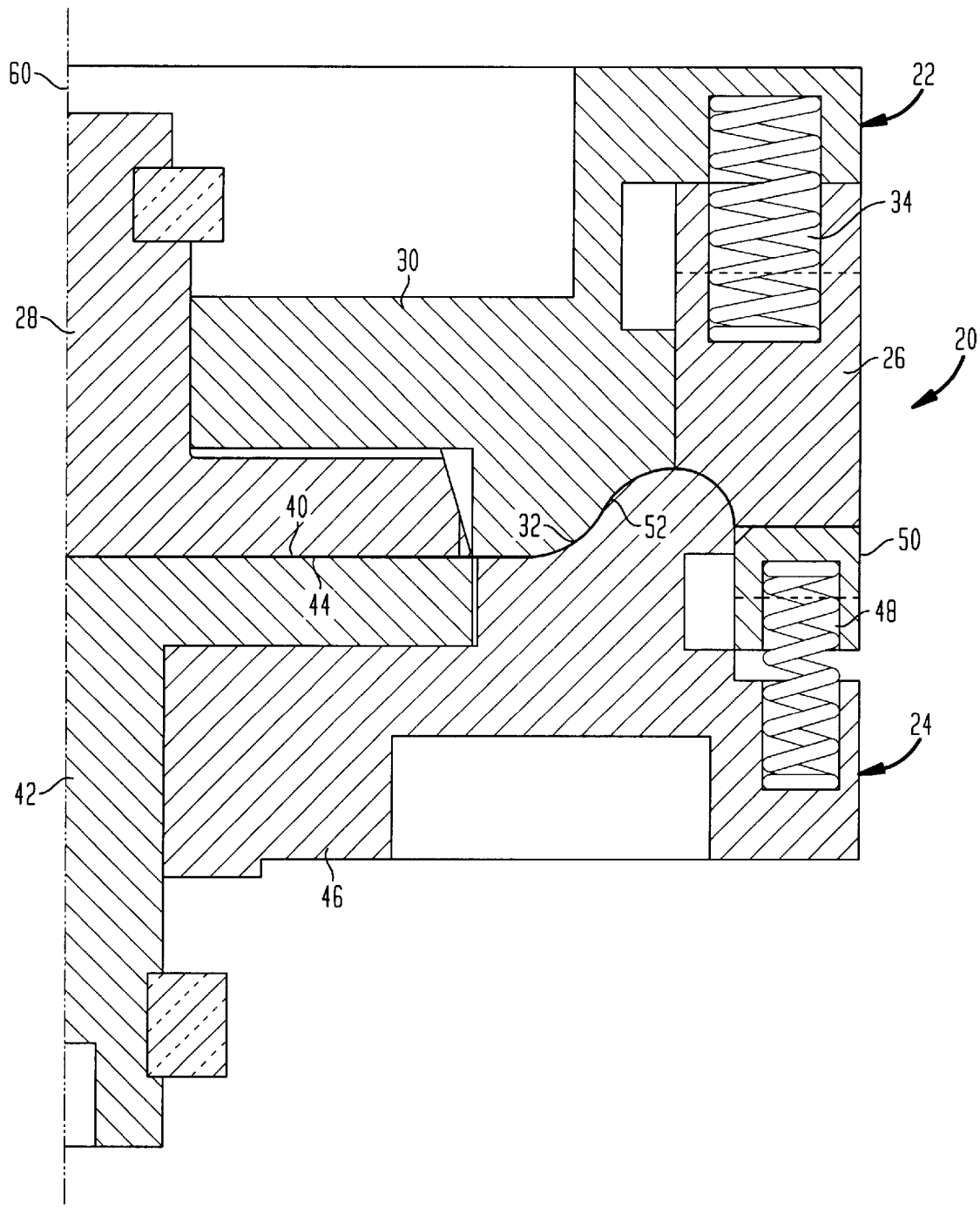
FIG. 3 is a schematic diagram of the apparatus of FIG. 2 in a closed or forming position.

It will be appreciated from FIGS. 2 and 3 that die halves 22,24 are substantially circular and are mounted about an axis of reciprocation 60 in opposing relationship. In an open position, as shown in FIG. 2, the die halves are spaced apart and the surfaces 40,44 project axially away from the base plates 30,46. This may be accomplished pneumatically, through the use of springs or by gravity as is well known in the art. In a forming cycle, the die halves are pressed together in a forming step as is shown in FIG. 3, wherein all of the opposing surfaces of the die are continuous surfaces which conform to the shape of the container to be formed, whether it be a plate, bowl, tray and so forth.

Figure 4A:
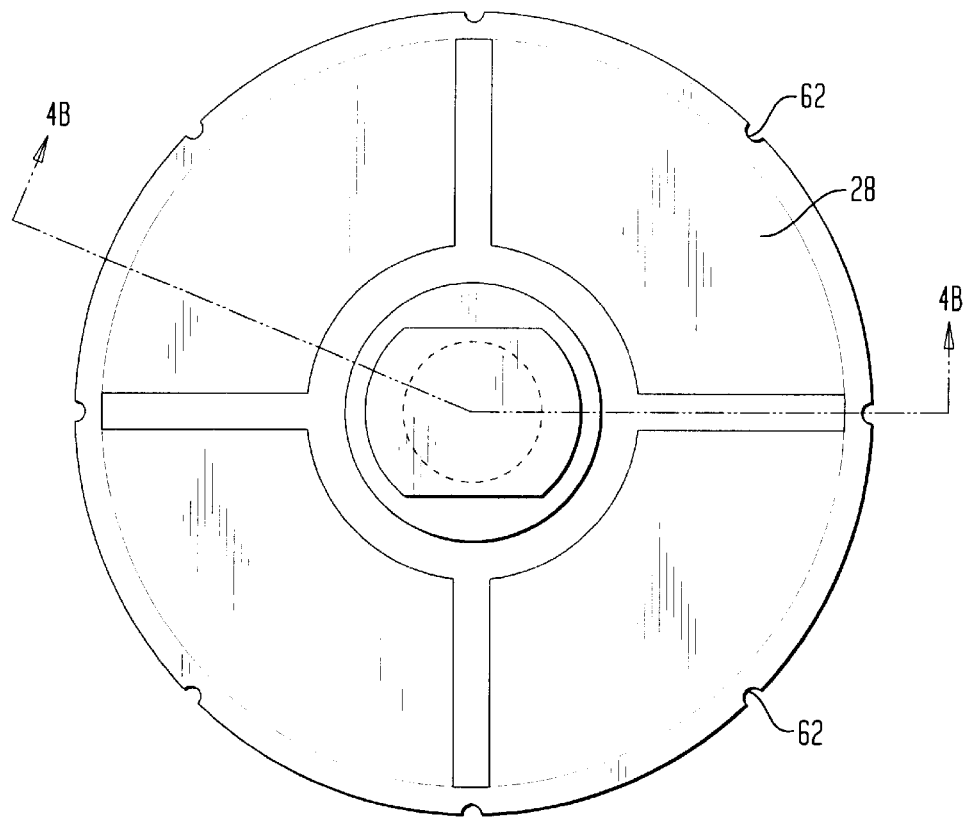
FIG. 4(a) is a plan view of a full area knock-out in the punch of FIGS. 2 and 3.
Figure 4B:
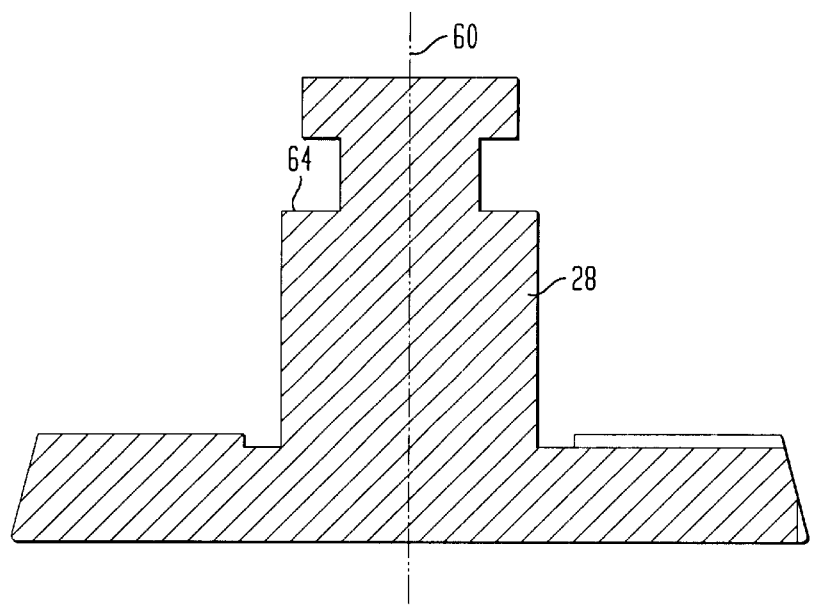
FIG. 4(b) is a view in elevation and section of the full area knock-out of FIG. 4(a)

Of particular relevance to the present invention is the knock-out 28 of punch 22 as can be seen in FIGS. 4(a) and 4(b). The knock-out shown in FIG. 4(a), which is a plan view of knock-out 28 is provided with a plurality of radial grooves 62 that can provide for air flow when the device is operating. Knock-out 28 is also provided with a plurality of radial and circumferential channels to provide air flow as well as shoulders 64 useful for mounting the knock-out in the segmented punch with a locking collar system.

Figure 5:
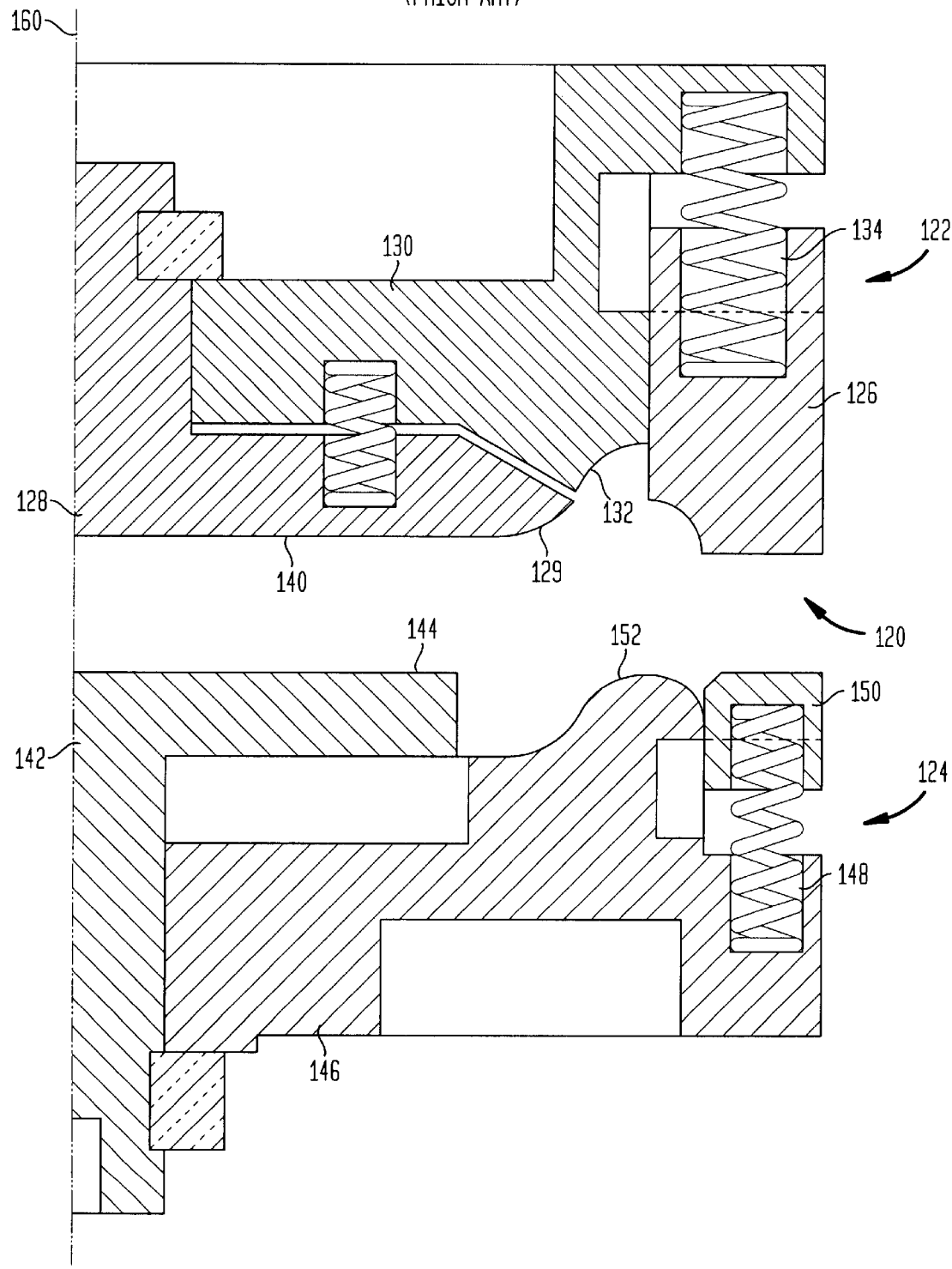
FIG. 5 is a schematic diagram in elevation and partial section of a known pressware die set illustrating a punch with an articulated full area knock-out in an open position.
Figure 6:
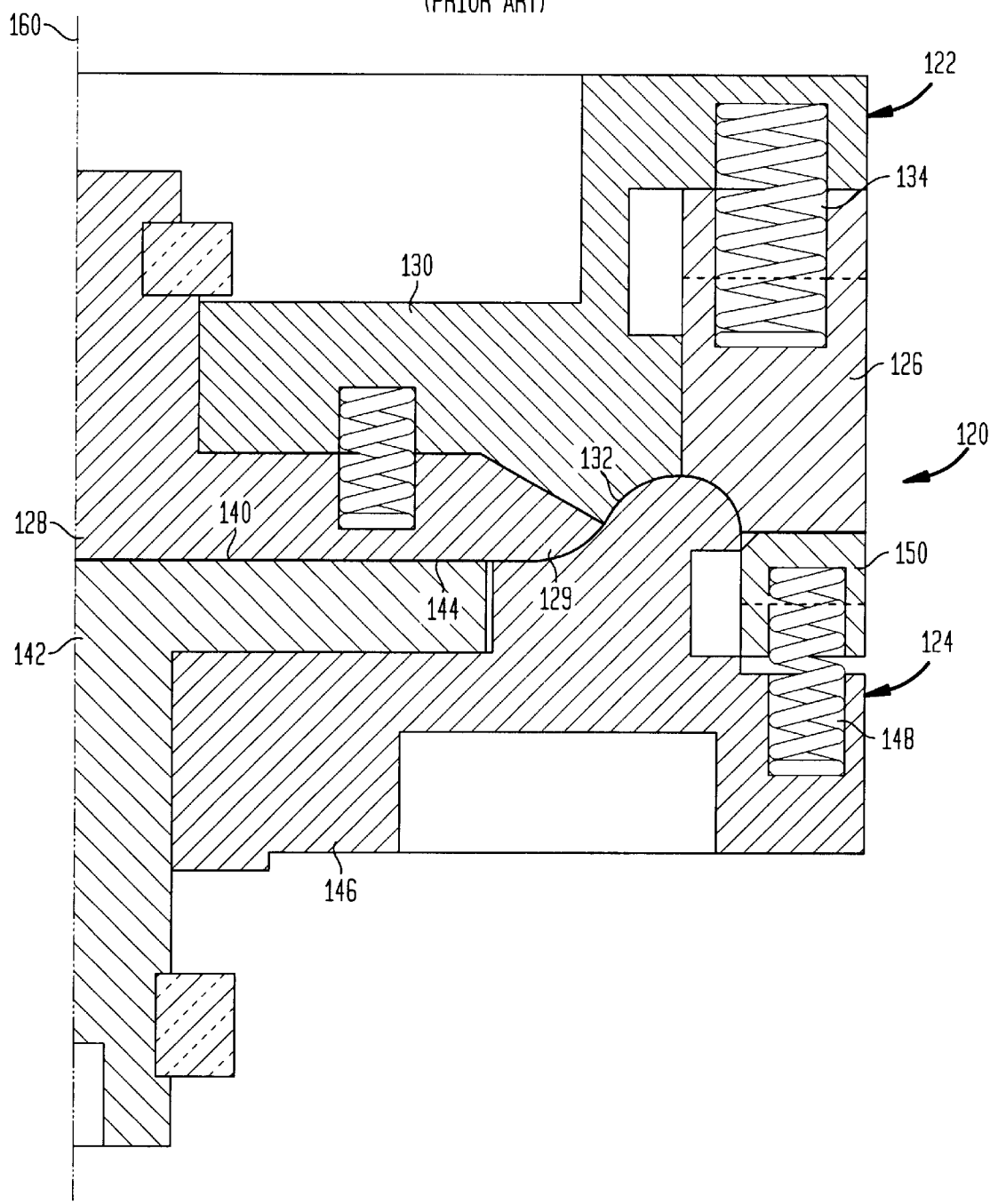
FIG. 6 is a schematic diagram of the apparatus of FIG. 5 in a closed or forming position.

FIGS. 5 and 6 illustrate another type of knock-out that is known in the art; specifically of the class described in U.S. Pat. No. 4,832,676 assigned to the assignee of the present invention. This type of knock-out, numbered as 128 in FIGS. 5 and 6, is known as an "articulated" knock-out. For purposes of brevity, corresponding parts are numbered 100 numerals higher in FIGS. 5 and 6 then in FIGS. 2 and 3, but otherwise are constructed and operate in much the same manner as the full-area knock-out die sets described above.

There is shown in FIG. 5, a die set 120 in an open position including a die 124 and a punch 122, while die 124 and punch 122 are shown in a closed or forming position in FIG. 6; both Figures are views in elevation and partial section as noted in connection with FIGS. 2 and 3. As can be seen from FIGS. 5 and 6, knock-out 128 generally has a shorter stroke then knock-out 28 of FIGS. 2 through 4 and has a curved forming surface shown at 129 about its periphery. The curved forming surface 129 advantageously pushes material towards the bottom and curved forming surface 129 of a container being formed from a container blank to ensure full height product formation, but can further compound the problem of separating a finished product from punch 122 as noted above.

Figure 7:
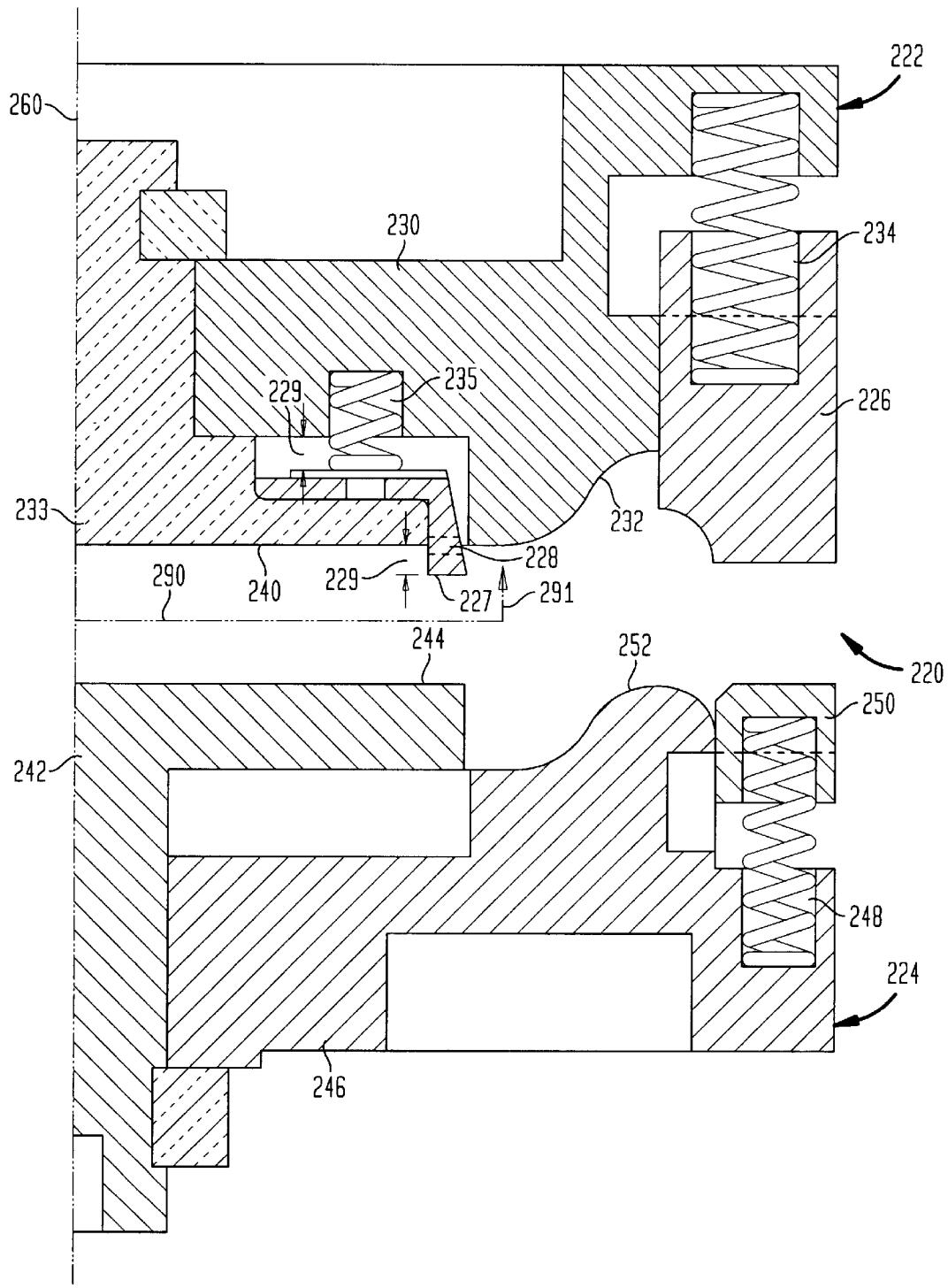
FIG. 7 is a view in partial elevation and section of a pressware die set in accordance with the present invention showing a punch provided with a stripper ring knock-out member in an open position.
Figure 8:
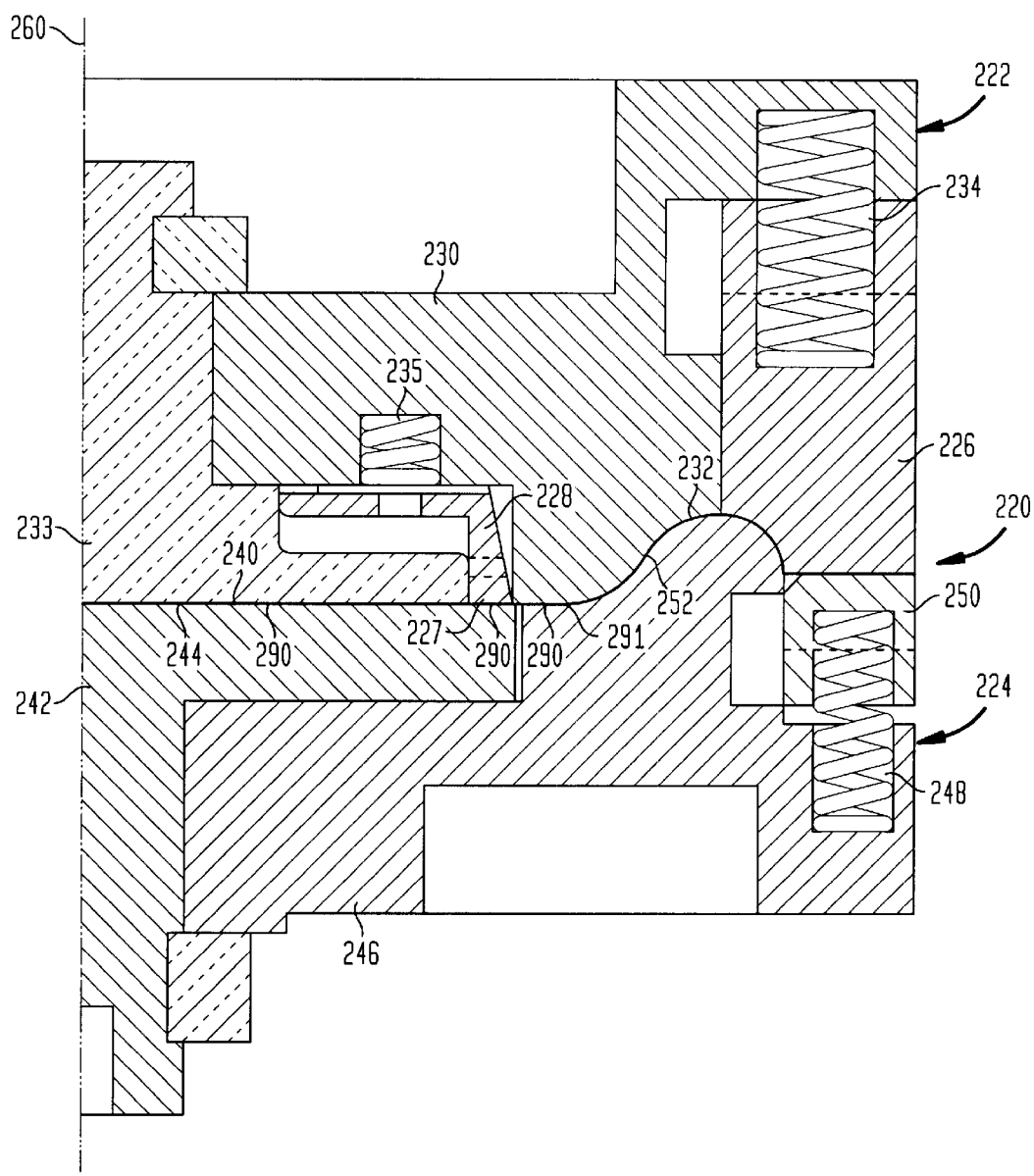
FIG. 8 is a schematic diagram of the apparatus of FIG. 7 in partial elevation and section in a closed or forming position.

There is shown in FIGS. 7 through 10(b) a first embodiment of an inventive apparatus constructed in accordance with the present invention. There is provided a die set 220 shown in FIG. 7 in open position having segmented punch 222 and segmented die 224. FIGS. 7 and 8 are partial views in elevation and section as noted in connection with FIG. 2 of a die set of the present invention, it being noted that the die sets are generally cylindrical and the parts generally disposed concentrically with respect to each other.

Punch 222 includes a pressure ring 226, a stripper ring knock-out member 228, a base plate 230 provided with a forming surface 232, and a knock-out stop 233. Also provided are springs indicated at 234 and 235 to bias ring knock-out member 228 and pressure ring 226 as shown in the open position of the die set 220. Knock-out stop 233 is provided with a substantially planar surface 240 which is configured to engage the planar bottom portion of a container as discussed herein.

Die 224 includes a full area knock-out 242 having a planar surface 244 opposing surface 240 of knock-out stop 233. Further provided is a base plate segment 246, a draw ring 250, which is biased by a plurality of springs indicated at 248.

Segment 246 has a forming surface 252 opposing surface 232 of base plate 230 of segmented punch 222.

Die halves 222, 224 are mounted about on axis of reciprocation 260 as shown in FIGS. 7 and 8 and the various parts reciprocate with respect to each other about axis 260 over a forming cycle between the positions shown in FIGS. 7 and 8, respectively In a typical case, the punch is mounted above the die and reciprocates with respect to the die which remains substantially in place, except perhaps moving over a small stroke by virtue of the fact the die may be spring mounted. This arrangement may be altered if so desired, for example, by locating the female die half upwardly with respect to the male punch and having the female die reciprocate toward the male punch.

The position shown in FIG. 7, or the "open" position, is the position of the die set when a blank is placed on die 224 prior to forming. It can be seen that stripper ring knock-out member 228 protrudes axially away from surface 240 when the die is open. This relative position of stripper ring knock-out member 228 is important to prevent formed product from staying adhered to the punch, that is, surface 227 of ring member 228 projects axially away from surface 240 when the die set is open. In the embodiment shown in FIGS. 7 through 10(b) the axial projection of member 228 is spring-assisted; however, the desired position and motion could be achieved by way of gravity, as discussed hereinafter, or may be pneumatically assisted or by any other suitable means as will be readily appreciated by one of skill in the art. It is noted that the area of surface 227 is much smaller than a substantially planar forming surface 290 of punch 222, thus making product stripping much easier than is the case with prior art full area knock-outs or prior art full area articulated knock-outs described above. The punch defines a substantially planar forming surface 290 (indicated on FIG. 8 and schematically on FIG. 7) which corresponds to the substantially planar bottom portion of the food service article to be formed. In the embodiment shown in FIGS. 7 and 8, surface 290 thus includes surface 240, surface 227 and a portion of forming surface 232, up to about where the sidewall portion of the die begins as indicated at 291. In general, the area of the annular (knock-out) surface 227 is anywhere from about 3–50% of the area of substantially planar surface 290. From about 6–30% is more typical, with the area 227 of the knock-out preferably being from about 8% to about 20% of the area 290 corresponding to the bottom portion of the container to be formed.

FIG. 8 shows die set 220 in the closed or forming position, that is, in the position the various segments have during the pressing of a container blank. As can be seen, stripper ring knock-out member 228 is fully retracted in this position such that surface 227 is contiguous or substantially (locally) coplanar with surface 240 and forms a part of surface 290 during forming. Member 228 reciprocates along axis 260 with respect to stop 233 along a relative stroke length 229 indicated on FIG. 7. The stroke length employed will depend on the die design, i.e., the product being manufactured, and is typically in the range of from about 1/16 to about 1 inch with perhaps a stroke length from surface 240 (or 290) of from about 1/8 inch to about 1/2 inch being typical for paperboard plates, trays, bowls and the like. Since ring member 228 is biased, it assumes the relative position to surface 240 shown in FIG. 7 when punch 222 moves away from die 224.

Figure 9A:
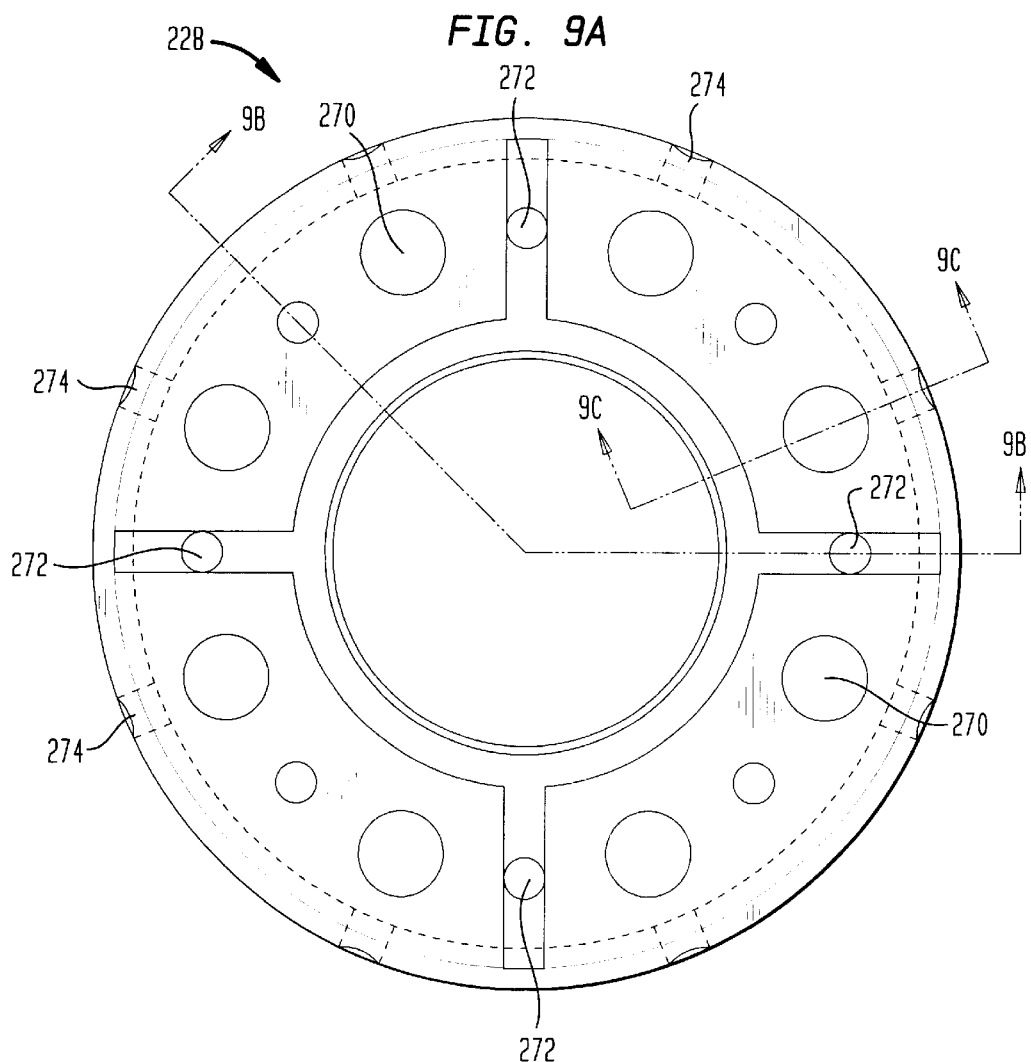
FIG. 9(a) is a plan view of a stripper ring knock-out constructed in accordance with the present invention.
Figure 9B:
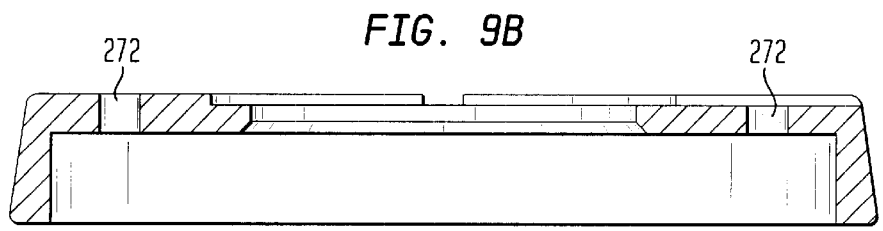
FIG. 9(b) is a view in elevation and section of the stripper ring knock-out of FIG. 9(a)
Figure 9C:
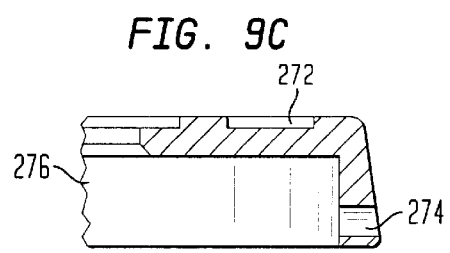
FIG. 9(c) is a view in partial elevation and section of the stripper ring knock-out of 9(a)
Figure 10A:
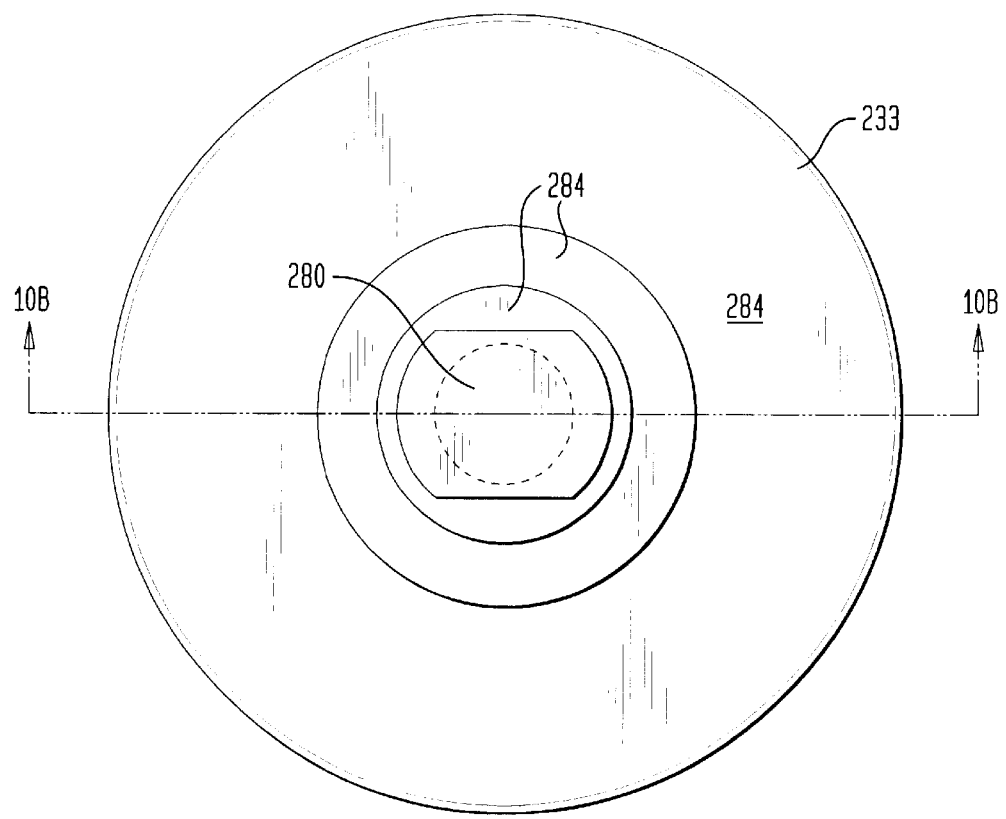
FIG. 10(a) is a plan view of a knock-out stop of FIGS. 7 and 8.
Figure 10B:
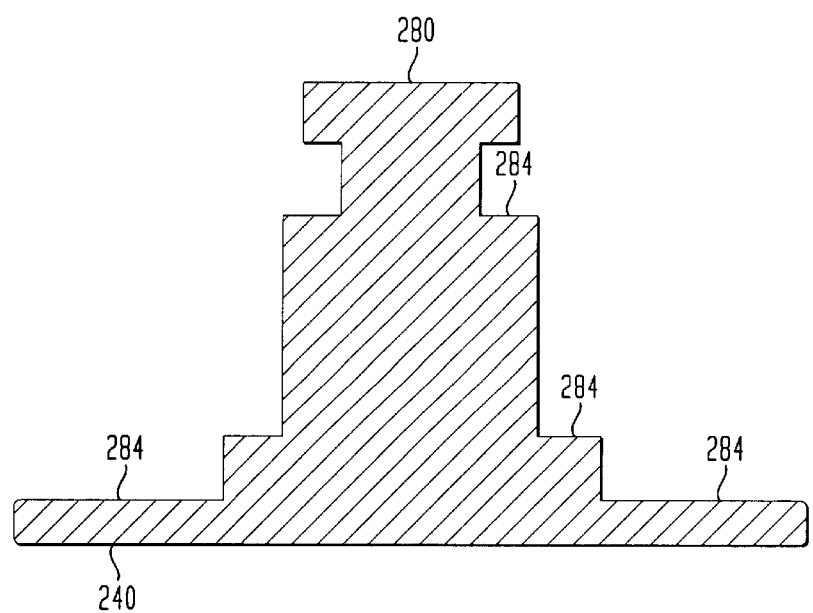
FIG. 10(b) is a view in elevation and section of the knock-out stop of FIG. 10(a)

Further sections of stripper ring knock-out member 228 of FIGS. 7 and 8 are illustrated in FIGS. 9(a) through 9(c), while knock-out ring stop 233 is further detailed in FIGS. 10(a) and 10(b).

FIG. 9(a) is a plan view of stripper ring knock-out member 228 showing a plurality of recesses 270 which may be used to place springs, such as springs 235 if so desired. So also, axial holes 272 are provided to vent the plate and prevent vacuum or pressure build up within the apparatus. Member 228 is further provided with radial holes 274 to vent the interior 276 of ring 228. When a container is disposed on ring 228, it will be appreciated that interior 276 will define a cavity with the container and, therefore, holes 274 will prevent a "billows" effect vacuum causing a container to be retained on punch 228. The various features of ring 228 are perhaps better illustrated in FIGS. 9(b) and 9(c) wherein FIG. 9(b) is a view in elevation and section along B—B of FIG. 9(a) and FIG. 9(c) is a view in elevation and section along C—C of FIG. 9(a).

There is shown in FIG. 10(a) a plan view of punch knock-out ring stop 233 and a view in elevation and section of stop 233 in along B—B of FIG. 10(a) in FIG. 10(b). The particular construction shown has a central retaining shaft 280 provided with a plurality of shoulders, 284, which can be used to mount the ring stop and limit the motion of stripper ring member 228.

Figure 11:
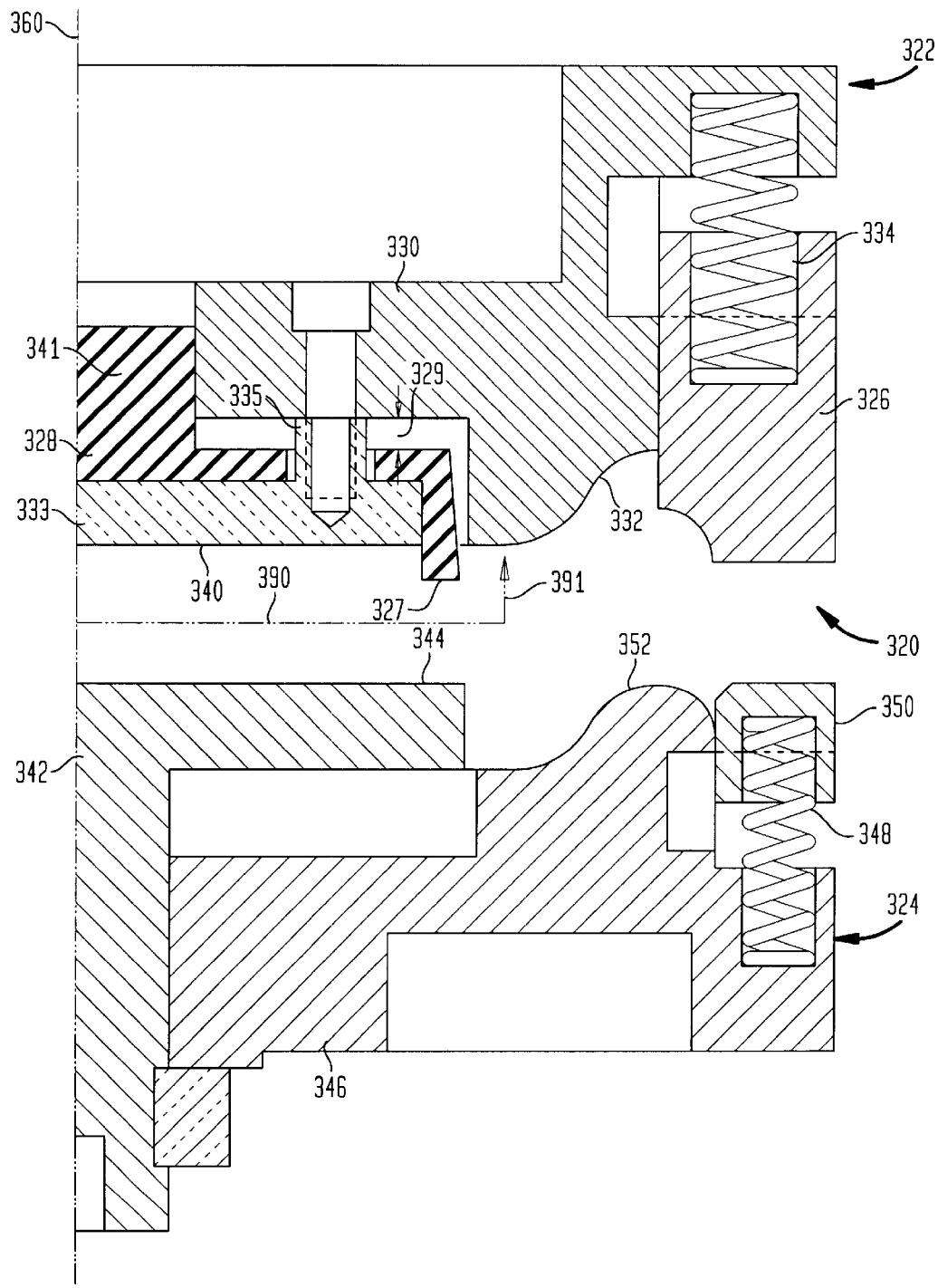
FIG. 11 is a schematic diagram in partial elevation and section of another pressware die set according to the invention in an open position.
Figure 12:
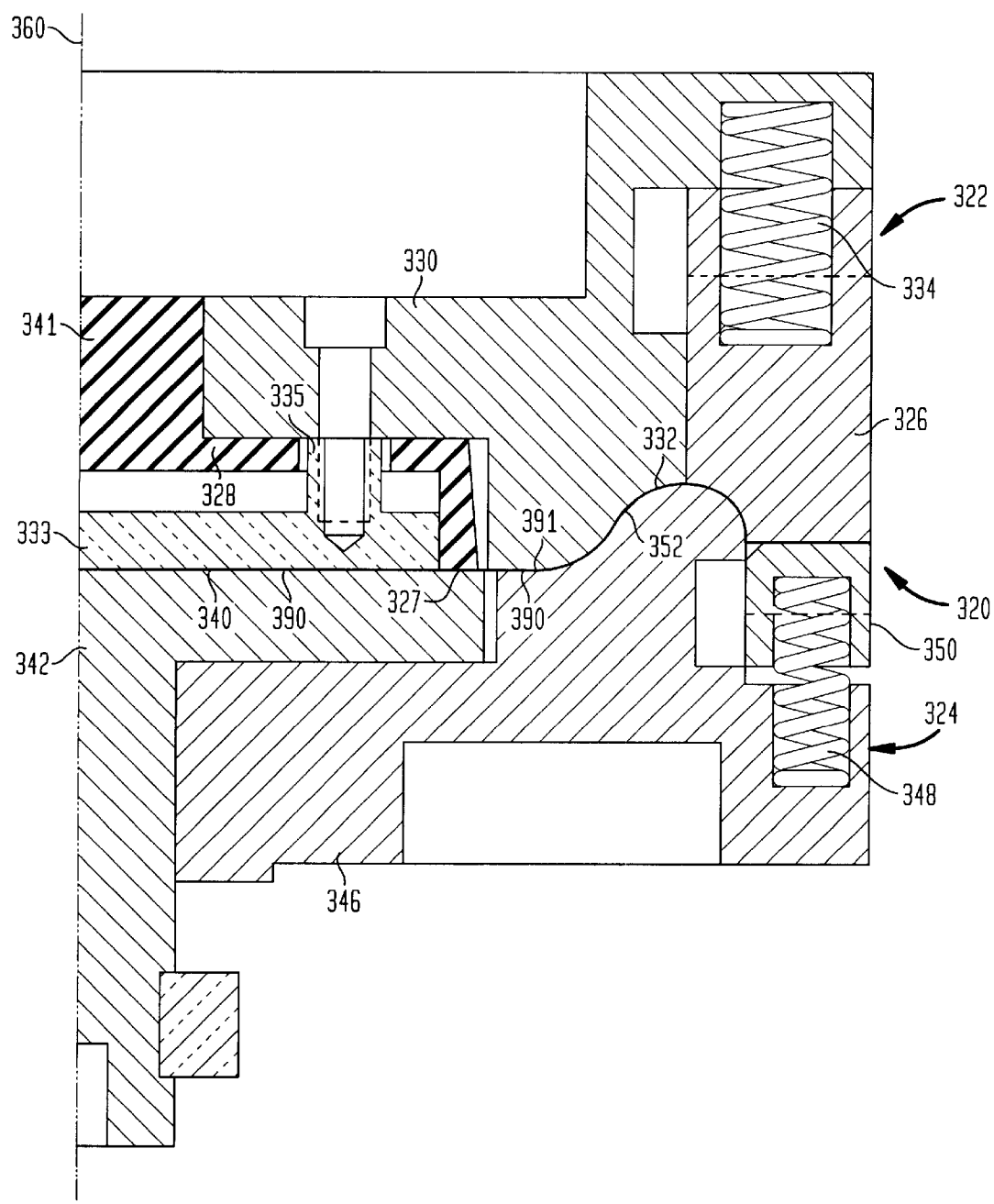
FIG. 12 is a schematic diagram in elevation and partial section of the apparatus of FIG. 11 wherein the die set is in a closed or forming position.

There is shown in FIGS. 11 through 14(b) another embodiment of an inventive apparatus constructed in accordance with the present invention. There is provided a die set 320 shown in FIG. 11 in open position having segmented punch 322 and segmented die 324. FIGS. 11 and 12 are partial views in elevation from the centerline and section of the die set, it being noted that the die sets are generally cylindrical and the parts generally disposed concentrically with respect to each other.

Punch 322 includes a pressure ring 326, a stripper ring knock-out member 328, a base plate 330 provided with a forming surface 332, and a knock-out stop 333. Also provided are springs indicated at 334 to bias pressure ring 326 as shown in the open position of the die set 320. Knock-out stop 333 is provided with a substantially planar surface 340 which engages to the planar bottom portion of a container as discussed herein.

Stop 333 may be provided with a plurality of pillars 335 to allow for mounting of the stop which limits the motion of stripper ring knock-out member 328. Ring member 328 is similar in many respects to ring member 228 except that it is not necessarily spring biased and may operate by gravity. In addition, the pillars 335 will prevent rotation of the ring stop as will be appreciated from the discussion which follows.

Die 324 includes a full area knock-out 342 as having a planar surface 344 opposing surface 340 of knock-out stop 333. Further provided is a base plate segment 346, a draw ring 350, which is biased by a plurality of springs indicated at 348.

Segment 346 has a forming surface 352 opposing surface 332 of base plate 330 of segmented punch 322.

Die halves 322, 324 are mounted about on axis of reciprocation 360 as shown in FIGS. 11 and 12 and the various parts reciprocate with respect to each other about axis 360 over a forming cycle between the positions shown in FIGS. 11 and 12, respectively.

The position shown in FIG. 11, or the "open" position is the position of the die set when a blank is placed on surface 344 prior to forming. It can be seen that stripper ring knock-out member 328 protrudes axially away from surface 340 when the die is open. This relative position of stripper ring knock-out member 328 is important to prevent formed product from staying adhered to the punch, that is, surface 327 of ring member 328 projects axially away from surface 340 when the die set is open. In the embodiment shown in FIGS. 11 through 14(b) the axial projection of member 328 is gravity activated; however, the desired position and motion could be achieved by way of springs or may be pneumatically assisted or assisted by other means as will be readily appreciated by one of skill in the art. Moreover, shaft portion 341 could be enlarged if so desired. So also, a bushing or bearing may be incorporated into base 330 or member 328 to reduce cyclic wear to shaft portion 341. It is noted that the area of surface 327 is much smaller than a substantially planar forming surface of punch 322. The punch defines a substantially planar forming surface 390 (indicated on FIG. 12 and schematically on FIG. 11) which corresponds to the substantially planar bottom portion of the food service article to be formed. In the embodiment shown in FIGS. 11 and 12, surface 390 thus includes surface 340, surface 327 and a portion of forming surface 332, up to about where the sidewall portion of the die begins as indicated at 391, thus making product stripping much easier then is the case with prior art full area knock-outs or prior art full area articulated knock-outs described above. In general, the area of the annular (knock-out) surface 327 is anywhere from about 3–50% of the area of bottom forming surface 390. From about 6–30% is more typical, with the area 327 of the knock-out preferably being from about 8% to about 20% of the area 390 of the member corresponding to the bottom portion of the container to be formed.

FIG. 12 shows die set 320 in the closed or forming position, that is, in the relating position the various segments have during the pressing of a container blank. As can be seen, stripper ring knock-out member 328 is fully retracted in this position such that surface 327 is contiguous or substantially coplanar with surface 340 and forms a part of surface 390 during forming. Member 328 reciprocates along axis 360 with respect to stop 333 along a relative stroke length 329 indicated on FIG. 11. The stroke length employed will depend on the die design, i.e., the product being manufactured, and is typically in the range of from about $\frac{1}{16}$ to about 1 inch with perhaps a stroke length from surface 340 (or 390) of from about $\frac{1}{8}$ inch to about $\frac{1}{2}$ inch being typical for paperboard plates, trays, bowls and the like. Since ring member 328 is actuated by gravity or other means, it assumes the relative position to surface 340 shown in FIG. 11 when punch 322 moves away from die 324.

Figure 13A:
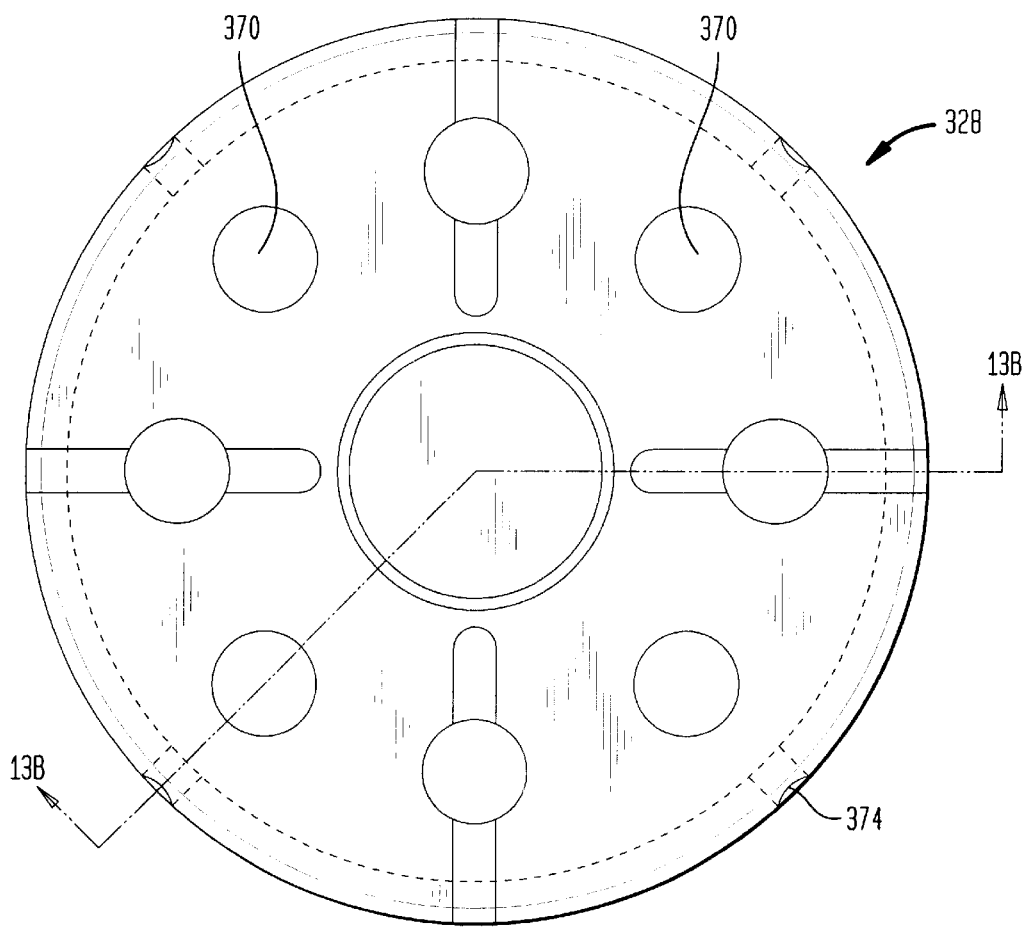
FIG. 13(a) is a plan view of stripper ring knock-out member disposed in the apparatus of FIGS. 11 and 12.
Figure 13B:
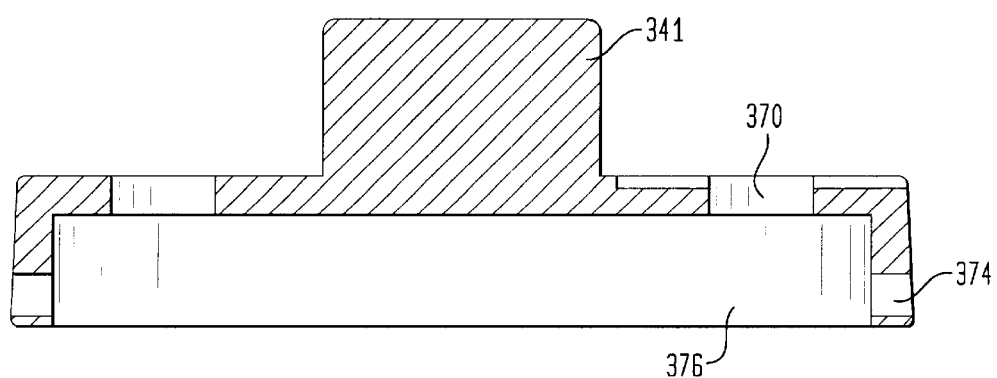
FIG. 13(b) is a view in elevation and section of the stripper ring knock-out of FIG. 13(a)
Figure 14A:
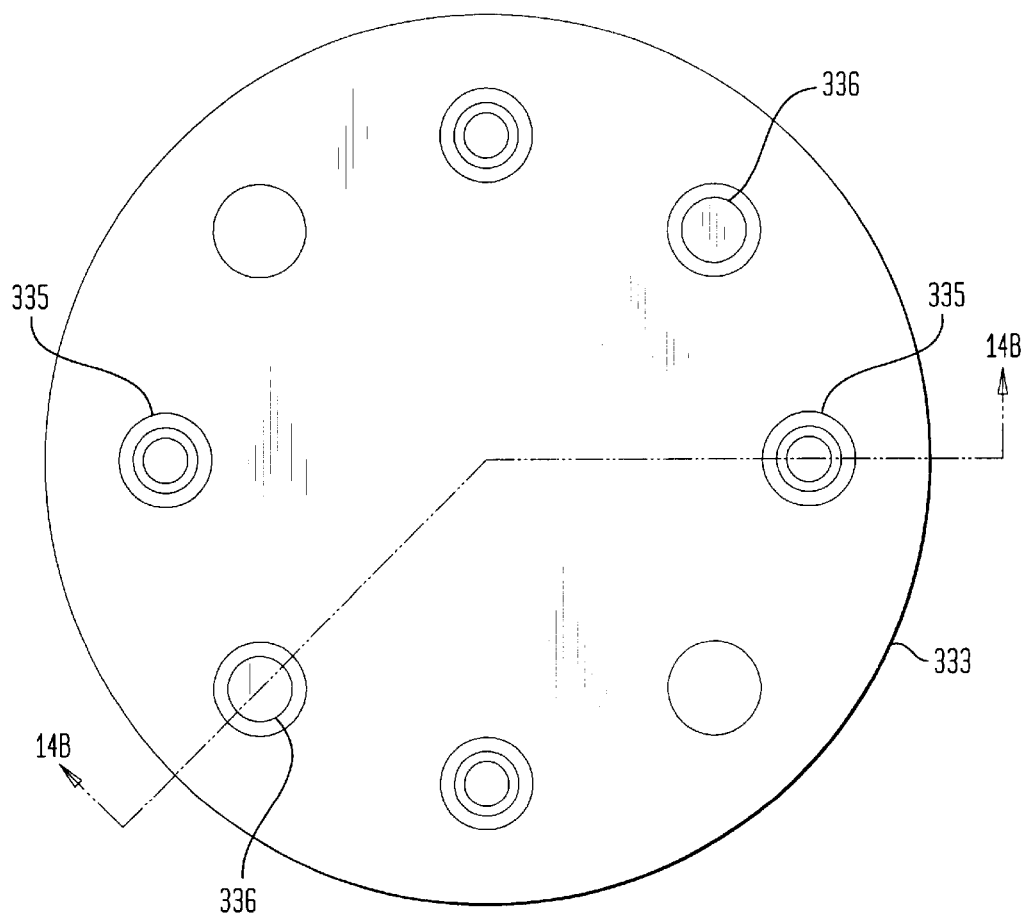
FIG. 14(a) is a plan view of the punch ring knock-out stop of the apparatus of FIGS. 11 and 12.
Figure 14B:
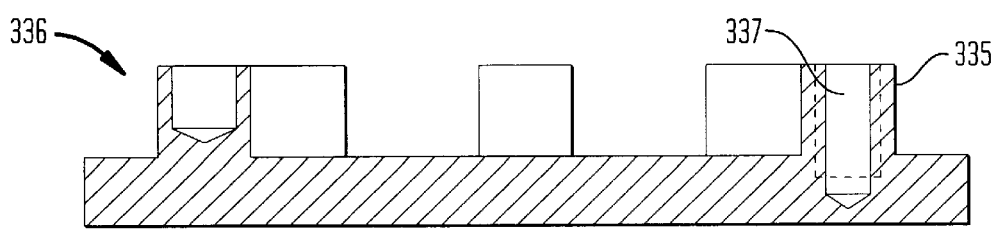
FIG. 14(b) is view in elevation and section of the knock-out stop of FIG. 14(a).

Further sections of stripper ring knock-out member 328 of FIGS. 11 and 12 are illustrated in FIGS. 13(a) and 13(b), while knock-out ring stop 333 is further detailed in FIGS. 14(a) and 14(b).

FIG. 13(a) is a plan view of stripper ring knock-out member 328 showing a plurality of holes 370 which may be used to receive pillars 335. Member 328 is further provided with radial holes 374 to vent the interior 376 of ring 328. When a container is disposed on ring 328, it will be appreciated that interior 376 will define a cavity with the container and, therefore, holes 374 will prevent a "billows" effect vacuum causing a container to be retained on punch 322. The various features of ring 328 are perhaps better illustrated in FIG. 13(b) wherein FIG. 13(b) is a view in elevation and section along B—B of FIG. 13(a).

There is shown in FIG. 14(a) a plan view of punch knock-out ring stop 333 and a view in elevation and section of stop 333 in along B—B of FIG. 10(a) in FIG. 14(b). The particular construction shown has a plurality of pillars which may have threaded holes 337 to receive retaining bolts to mount stop 333 to base 330. Holes 370 of stripper ring knock-out member fit about pillars 335 as will be appreciate from FIGS. 11 and 12. So also, several pillars 336 may have reamed holes for pinning punch knock-out stop 333 to base 330 to provide the correct positioning.

While the invention has been illustrated in connection with various embodiments, modifications within the spirit and scope of the present invention will be apparent to those of skill in the art. Thus, while the stripper ring knock-out has been illustrated and described as a concentric ring about an inner flat surface for forming the bottom portion of a disposable food service pressware article, various other geometries could be employed. For example, the stripper ring could be an articulated ring extending into the sidewall forming area of the punch, or the stripper ring could comprise a spoked ring, or the stripper knock-out could consist of spokes. Moreover, a stripper knock-out member need not be circular and could comprise or consist of a plurality of radial spokes. So also, a stripper ring knock-out or stripper knock-out may be designed for circular, oval, square, multi-sided polyhexal, etc. plates, bowls and trays with the same general components. The present invention may also provide utility to disposable food serving containers formed from paperboard plastic composite. Such modifications are within the spirit and scope of the present invention which is set forth in the appended claims.

What is claimed is:

1. In a reciprocating presswear die set, including a male punch half and a female die half, a segmented punch for fabricating a pressed disposable food service article, said article having a substantially planar bottom portion, a sidewall portion and a rim portion, said die halves being mounted to reciprocate cyclically between an open position and a forming position about an axis of reciprocation, said punch comprising:

(a) outer punch means for forming the sidewall and rim portions of said pressed disposable food service article;

(b) central punch means suitably mounted inwardly with respect to said outer punch means wherein said central punch means and optionally said outer punch means define a substantially planar punch surface configured to engage said substantially planar bottom portion of said article during a forming cycle; and (c) a knock-out stripper member disposed inwardly with respect to the outer punch means juxtaposed with said substantially planar punch surface defining an annular knock-out surface and being reciprocally mounted with respect to said substantially planar punch surface such that said knock-out surface is contiguous with said substantially planar punch surface when said punch is in said forming position and wherein further said knock-out surface of said knock-out stripper member projects axially from said substantially planar punch surface toward said female die when said die set reciprocates toward said open position and wherein further the area of said knock-out surface is from about 3 to about 50% of the surface area of said substantially planar punch surface of said punch.

2. A segmented punch according to claim 1, wherein the area of said knock-out surface is from about 6 to about 30% of the surface area of said substantially planar punch surface of said punch.

3. The segmented punch according to claim 2, wherein the area of said knock-out surface is from about 8% to about 20% of the surface area of said substantially planar punch surface of said punch.

4. The segmented punch according to claim 1, wherein the said knock-out surface of said knock-out stripper member reciprocates over a stroke length of from about 1 inch to about 1/16 inch from said substantially planar punch surface of said punch.

5. The segmented punch according to claim 4, wherein said knock-out surface reciprocates over a stroke length of from about 1/2 inch to about 1/8 inch from said substantially planar punch surface of said punch.

6. The segmented punch according to claim 1, wherein said knock-out stripper member comprises an annular ring concentrically disposed about the periphery of said central punch means of said segmented punch.

7. The segmented punch according to claim 1, wherein said knock-out stripper member is biased to project toward said female die in said open position.

8. The segmented punch according to claim 1, wherein said segmented punch further comprises means for biasing said knock-out stripper member toward said female die in said open position.

9. The segmented punch according to claim 8, wherein said biasing means include at least one spring.

10. The segmented punch according to claim 1, wherein said knock-out stripper member is biased towards said female die in said open position by gravity.

11. The segmented punch according to claim 10, wherein said knock-out surface is coupled to a weight internally located in said punch.

12. The segmented punch according to claim 11, wherein said weight comprises a shaft coupled to said knock-out surface.

* * * * *

UNITED STATES PATENT AND TRADEMARK OFFICE
CERTIFICATE OF CORRECTION

PATENT NO. : 6,589,043 B1
DATED : July 8, 2003
INVENTOR(S) : Albert D. Johns et al.

It is certified that error appears in the above-identified patent and that said Letters Patent is hereby corrected as shown below:

Column 1,
Line 51, change "it's" to -- its --;
Line 57, insert -- in -- after "and";
Line 65, change "are" to -- is --;

Column 2,
Line 4, change "underling" to -- underlying --;
Line 27, change "decline" to -- declines --;

Column 5,
Line 37, insert -- , -- after "paper";

Column 7,
Line 60, insert -- a -- after "is";

Column 9,
Line 4, change "then" to -- than --;
Line 47, change "on" to -- an --;
Line 51, insert -- . -- after "respectively";

Column 10,
Line 61, delete "in" before "along";

Column 11,
Line 32, change "on" to -- an --;
Line 64, change "then" to -- than --;

UNITED STATES PATENT AND TRADEMARK OFFICE
CERTIFICATE OF CORRECTION

PATENT NO. : 6,589,043 B1
DATED : July 8, 2003
INVENTOR(S) : Albert D. Johns et al.

It is certified that error appears in the above-identified patent and that said Letters Patent is hereby corrected as shown below:

Column 12,
Line 39, delete "in" before "along"; and
Line 43, change "appreciate" to -- appreciated --.

Signed and Sealed this

Fourth Day of November, 2003

JAMES E. ROGAN
*Director of the United States Patent and Trademark Office*